(12) United States Patent
Buerger et al.

(10) Patent No.: US 11,554,330 B2
(45) Date of Patent: Jan. 17, 2023

(54) PLUG UNITS, PARTICULARLY FOR HPLC, CONNECTION SYSTEM AND CORRESPONDING USE

(71) Applicant: DIONEX SOFTRON GMBH, Germering (DE)

(72) Inventors: Daniel Buerger, Raisting (DE); Michael Schadl, Schiltberg (DE); Til Richardsen, Kirchseeon (DE)

(73) Assignee: Dionex Softron GmbH, Germering (DE)

( * ) Notice: Subject to any disclaimer, the term of this patent is extended or adjusted under 35 U.S.C. 154(b) by 0 days.

(21) Appl. No.: 16/216,592

(22) Filed: Dec. 11, 2018

(65) Prior Publication Data

US 2019/0176054 A1 Jun. 13, 2019

(30) Foreign Application Priority Data

Dec. 12, 2017 (DE) .................. 10 2017 129 674.3

(51) Int. Cl.
*B01D 15/14* (2006.01)
*G01N 30/60* (2006.01)
*G01N 30/02* (2006.01)

(52) U.S. Cl.
CPC ......... *B01D 15/14* (2013.01); *G01N 30/6026* (2013.01); *G01N 30/6078* (2013.01); *G01N 2030/027* (2013.01)

(58) Field of Classification Search
CPC ............... B01D 15/14; G01N 30/6026; G01N 30/6078; G01N 2030/027; G01N 30/6004; G01N 2030/6013
See application file for complete search history.

(56) References Cited

U.S. PATENT DOCUMENTS

| | | | |
|---|---|---|---|
| 3,362,731 A | 1/1968 | Fred et al. | |
| 3,973,792 A | 8/1976 | Gonner et al. | |
| 4,083,702 A | 4/1978 | Hartigan et al. | |
| 4,619,473 A | 10/1986 | Someya | |
| 4,669,756 A | 6/1987 | Cassaday et al. | |
| 4,787,656 A | 11/1988 | Ryder et al. | |
| 4,991,883 A | 2/1991 | Worden et al. | |
| 5,163,722 A | 11/1992 | Worden et al. | |
| 5,194,226 A | 3/1993 | Tomoff et al. | |
| 5,582,723 A | 12/1996 | Boone et al. | |
| 5,848,813 A | 12/1998 | Albrecht et al. | |
| 6,032,876 A | 3/2000 | Bertsch et al. | |
| 6,095,572 A | 8/2000 | Ford et al. | |
| 6,102,449 A | 8/2000 | Welsh et al. | |
| 6,193,286 B1 | 2/2001 | Jones et al. | |
| 6,494,500 B1 * | 12/2002 | Todosiev | G01N 30/6026 285/279 |

(Continued)

FOREIGN PATENT DOCUMENTS

| | | |
|---|---|---|
| CA | 889204 A | 12/1971 |
| CN | 102792082 A | 11/2012 |

(Continued)

*Primary Examiner* — Ryan B Huang

(57) ABSTRACT

A plug unit configured for use in high performance liquid chromatography is described. The plug unit comprises a capillary comprising a capillary distal face; a sealing element, wherein at least a portion of the sealing element is located distal from the capillary distal face; and a biasing element configured to bias the capillary towards the sealing element.

17 Claims, 5 Drawing Sheets

(56) References Cited

U.S. PATENT DOCUMENTS

| | | | |
|---|---|---|---|
| 8,702,130 B1 | 4/2014 | Zelechonok | |
| 2014/0130580 A1* | 5/2014 | Mcadams | G01N 30/6026 73/61.52 |
| 2015/0048015 A1* | 2/2015 | Joudrey | G01N 30/56 210/198.2 |
| 2016/0296761 A1* | 10/2016 | Doan | A61N 1/057 |
| 2016/0305586 A1* | 10/2016 | Graham | G01N 30/32 |
| 2019/0091693 A1* | 3/2019 | Hirmer | B01L 3/563 |

FOREIGN PATENT DOCUMENTS

| | | | | |
|---|---|---|---|---|
| CN | 103748396 A | 4/2014 | | |
| CN | 103807530 A | 5/2014 | | |
| EP | 3163298 A2 | 5/2017 | | |
| EP | 3244205 A1 * | 11/2017 | ......... | G01N 30/6026 |
| FR | 1027172 A | 11/1950 | | |
| GB | 895461 A | 5/1962 | | |
| WO | WO-9423234 A1 | 10/1994 | | |
| WO | WO-2005084337 A2 | 9/2005 | | |
| WO | 2010/133192 A1 | 11/2010 | | |
| WO | 2011/076244 A1 | 6/2011 | | |
| WO | 2017194193 A1 | 11/2017 | | |

\* cited by examiner

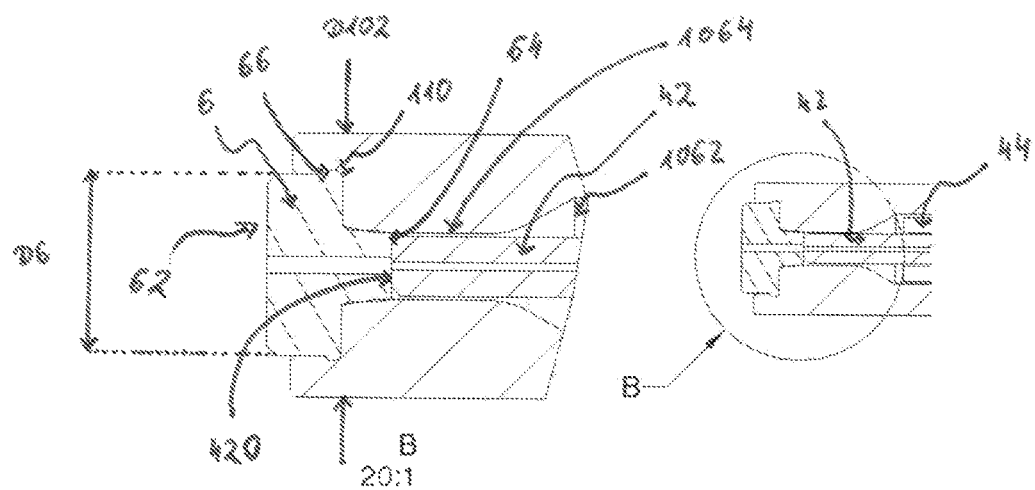
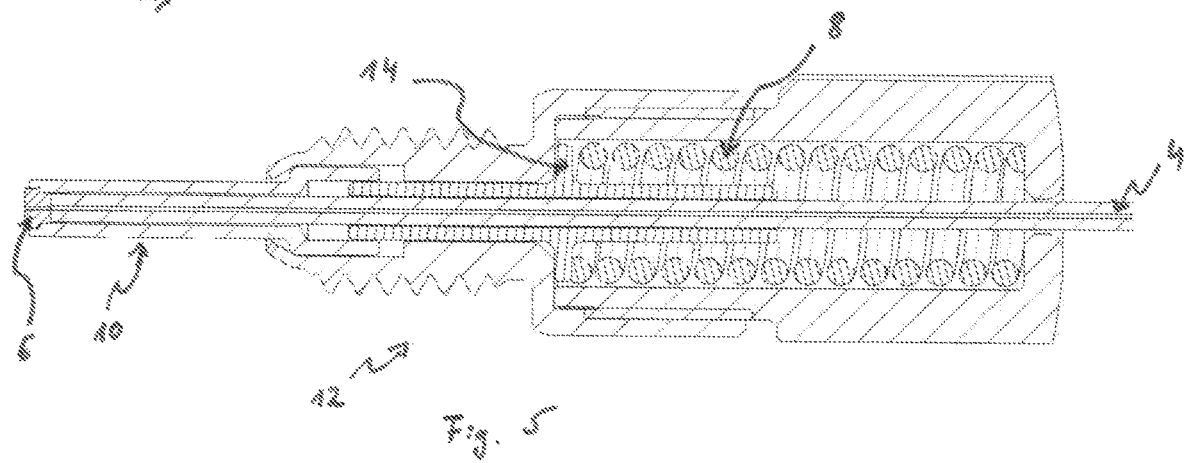
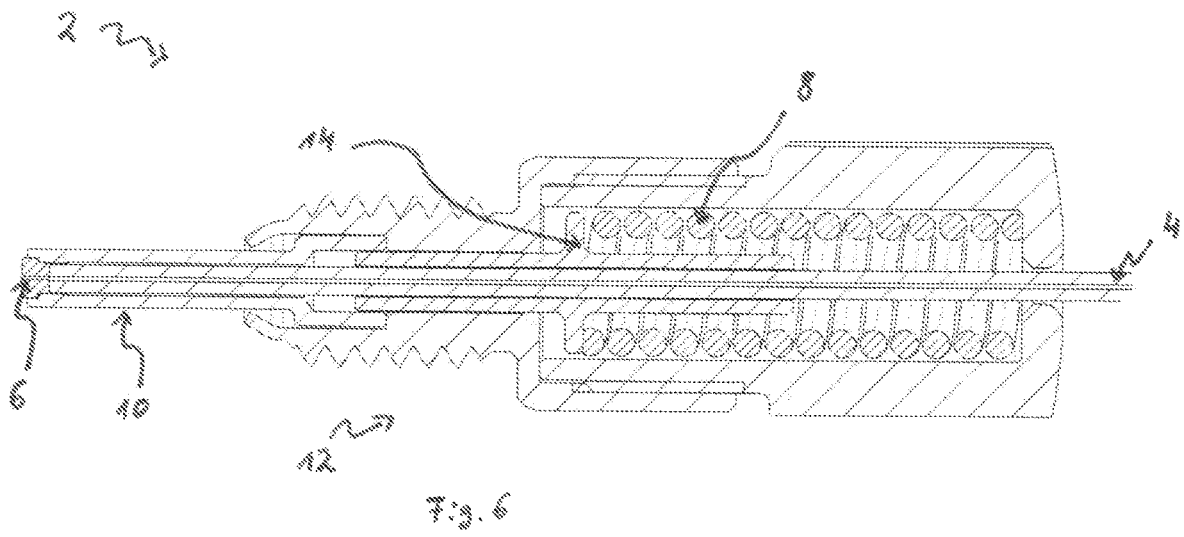

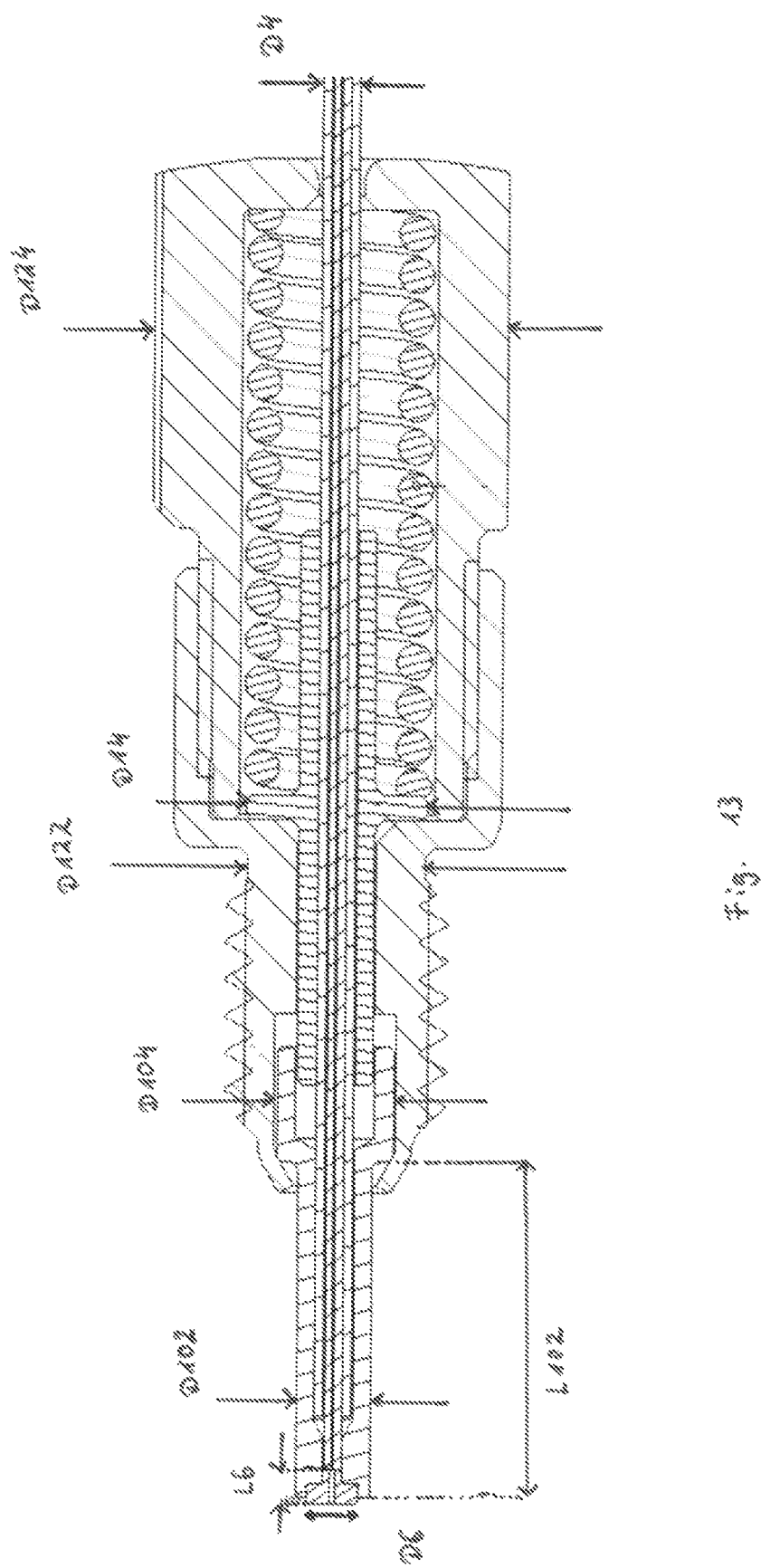

PLUG UNITS, PARTICULARLY FOR HPLC, CONNECTION SYSTEM AND CORRESPONDING USE

CROSS-REFERENCE TO RELATED APPLICATION

This application claims the priority benefit under 35 U.S.C. § 119 to German Patent Application No. DE 10 2017 129 674.3, filed on Dec. 12, 2017, the disclosure of which is incorporated herein by reference.

FIELD OF THE INVENTION

The present invention generally relates to connecting capillaries. In particular embodiments, the present invention relates to the field of High Performance Liquid Chromatography (HPLC).

BACKGROUND

HPLC is a method of separating samples into their constituent parts. The constituent parts can be separated for subsequent use or their portions can be quantified. In order to fluidly connect HPLC equipment, capillaries mostly made of stainless steel, glass (fused silica) or PEEK are used. For biocompatible HPLC systems, titanium, fused silica, MP35N™ or PEEK™ capillaries are used, e.g., in order to be as iron-free as possible. In order to interconnect such capillaries, suitable connectors are advantageous.

Capillary connecting lines are equipped at their ends with devices suitable to establish a leakproof connection to the connectors of the components. These devices are also designated as fittings. Such fittings are already mentioned as state of the art in U.S. Pat. No. 4,083,702 and in U.S. Pat. No. 4,619,473.

According to one present system for interconnecting a capillary to another element, a threaded ring is squeezed against a cone, whereby the threaded ring seals outwards radially and inwards in the direction of the capillary tube. In order to provide leakproof connections, the connection must be turned inwards and tightened with a torque of several Newtons.

At the same time, the exact moment when a screw connection is safely sealed cannot be defined accurately. Moreover, there is a risk that the fittings might be damaged by applying excessive torques.

A further system for connecting a capillary to another unit is disclosed in WO2010133192. However, the system disclosed therein may have certain drawbacks and limitations: The system may not be completely free from dead volume, as, due to the production process, it cannot be ensured that the fused silica capillary is directly adjacent to the seal. Further, a clearance to the base would have to be left in, as otherwise the glass capillary would rest on the base, which would destroy the capillary.

A further system is disclosed in EP3163298. However, also this system may have certain drawbacks and limitations: It may also not be completely free from dead volume, as, due to the production process, it cannot be ensured that the fused silica is directly adjacent to the seal.

In light of the above, it is an object to overcome or at least alleviate the shortcomings and disadvantages of the prior art. That is, it is an object of the present invention to provide a plug unit and a capillary connection system providing a secure seal and/or protecting components from damage.

These objects are met by the present invention.

SUMMARY

In a first embodiment, the present invention relates to a plug unit. The plug unit comprises a capillary comprising a capillary distal face. The plug unit further comprises a sealing element, wherein at least a portion of the sealing element is located distal from the capillary distal face.

The plug unit may also comprise a biasing element configured to bias the capillary towards the sealing element. The biasing element may also generally be referred to as an element configured to store a force.

The plug unit may also be referred to as a male connector unit, or simply as a male connector. It may also be referred to as a male capillary fitting unit. In this specification, the terms distal and proximal will be used. As regards the plug unit, distal (vs. proximal) denotes that a section is further distanced from the center of the capillary than another section. That is, e.g., when connecting the plug unit with a socket unit, the most distal portion of the plug unit will be inserted first (and deepest) into the socket unit. Proximal denotes the opposite to distal. That is, the capillary distal face may also be referred to as the capillary front face. Further, at least a portion of the sealing element being located distal from the capillary distal face may also be referred to as at least a portion of the sealing element being located more forward than the capillary distal face.

It will be understood that the plug unit may be secured inside a socket unit (which may also be referred to as a port). In other words, a plug unit with a front side seal may be secured in a port and a sealed connection may be implemented via a biasing element (such as a spring) inside the plug unit. The plug unit may also comprise a sleeve and the spring may be located in the sleeve.

The capillary may comprise an outer diameter in the range of 150 μm to 1,000 μm, such as 500 μm to 1,000 μm.

The sealing element may comprise a distal end with an outer diameter in the range of 1,000 μm to 1,400 μm.

The sealing element may comprise an axial length in the range of 400 μm to 1,200 μm.

The plug unit may further comprise a thrust piece.

The sealing element may be fixed to the thrust piece.

That is, the sealing element may be fixed to the thrust piece, independent of any other component, i.e., the sealing element may be fixed to the thrust piece also when the plug unit is not connected to a socket unit.

The sealing element may be located at a distal end of the thrust piece, and preferably at least a section of the sealing element may be received in the thrust piece.

The sealing element may comprise a distal end face with a smaller outer diameter than an outer diameter of the distal end of the thrust piece.

Thus, when the plug unit is inserted in a bushing unit (also referred to as socket unit), only a distal face of the sealing element may come into contact with the bushing unit. This may result in a particularly defined sealing. Further, by not having circumferential sections of the sealing element contacting the bushing unit, it may be easier to insert the plug unit into the bushing unit and to remove the plug unit from the bushing unit.

The sealing element may be fixed to the thrust piece by means of an undercut.

This may be a particularly simple connection mechanism between the sealing element and the thrust piece. In other words, the thrust piece may comprise an undercut and the sealing element may comprise a corresponding protruding section fitting into the undercut. Such a simple connection may be facilitated by the biasing element, as it may thus be possible to only provide a substantial sealing force between the capillary and the sealing element when the plug unit is connected to a socket unit (and otherwise, not having such a substantial force between these elements).

The thrust piece may comprise a distal section with a distal thrust piece diameter.

The distal section of the thrust piece may have an axial length in the range of 4,000 μm to 11,000 μm.

The distal thrust piece diameter may be in the range of 600 μm to 2,000 μm, such as 1,500 μm to 2,000 μm.

The thrust piece may surround the capillary, and the capillary may be configured to move axially with respect to the thrust piece. That is, the axial position of these elements may be not fixed with respect to one another.

The plug unit may further comprise a housing assembly.

The housing assembly may house the biasing element.

The housing assembly may comprise a connection mechanism for connecting the plug unit to a socket unit.

The connection mechanism may be a thread.

The housing assembly may comprise a first housing section and a second housing section.

The connection mechanism may be located on the first housing section.

The second housing section may house the biasing element.

The second housing section may have a greater outer diameter than the first housing section.

The first housing section may have an outer diameter in the range of 3,200 μm to 5,000 μm.

The second housing section may have an outer diameter in the range of 6,000 μm to 10,000 μm.

The housing assembly may comprise a thrust piece receiving opening, and at least a section of the thrust piece may be received in the thrust piece receiving opening.

The thrust piece may be configured to move axially with respect to the housing assembly.

The thrust piece may further comprise a proximal section with a proximal thrust piece diameter, and the proximal section may be received in the thrust piece receiving opening, and the thrust piece receiving opening may comprise an inner diameter being greater than the proximal thrust piece diameter.

The housing assembly may further comprise a distal section having an inner diameter being greater than the distal thrust piece diameter and smaller than the proximal thrust piece diameter. For example, the distal section of the housing assembly may be flanged inwardly. Thus, the thrust piece may be received in the housing assembly, and may move relative to the housing assembly, while making sure that the thrust piece cannot fall out of the housing assembly.

The proximal thrust piece diameter may be in the range of 2,100 μm to 3,100 μm.

The plug unit may further comprise a thrust transmission element fixed to the capillary.

The thrust transmission element may be configured to transmit an axial force from the biasing element to the capillary.

The thrust transmission element may be fixed to the capillary by crimping, gluing, a form fit, and/or a press fit.

The thrust transmission element may comprise an outer diameter in the range of 3,200 μm to 5,000 μm.

The thrust transmission element may comprise a proximal face configured to be subjected by an axial force of the biasing element.

The thrust transmission may be located inside the housing assembly.

The sealing element may protrude distally from the thrust piece.

Further, it will be understood that when the plug unit is connected to a socket unit, the sealing element may be compressed.

The sealing element may comprise a distal section with a distal diameter and a proximal section with a proximal diameter, the proximal diameter being smaller than the distal diameter.

The proximal diameter may be at least 10% smaller than the distal diameter.

The thrust piece may comprise a channel for receiving the capillary.

The channel may have a uniform diameter. In other words, the channel may comprise a uniform inner diameter.

The capillary may comprise a uniform outer diameter.

The uniform outer diameter of the capillary may be in the range of 740 μm to 840 μm or in the range of 500 μm to 700 μm.

The capillary may comprise fused silica; PEEK; and/or metal, such a stainless steel, MP35N, or titanium; and may preferably be realized a metal capillary with an inner PEEK coating.

That is, some embodiments of the present invention comprise a capillary comprising an outer metal (e.g., stainless steel) section and an inner section formed of PEEK. It will be understood that typically only the inner section comes into contact with the liquid conveyed through the capillary. The present invention is particularly well suited for such a capillary. When the liquid flows through the capillary, only the inner PEEK section comes into contact with the liquid. Further, the biasing element firmly presses the capillary against the sealing element. Thus, at the transition from the capillary to the sealing element, the liquid only comes into contact with the inner section of the capillary and with the sealing element. As the capillary is firmly pressed against the sealing element, in particular, the liquid does not come into contact with the outer section of the capillary. This may be advantageous for different reasons: First, the dead volume of the system may be reduced. Second, the liquid not coming into contact with the metal outer section of the capillary may also be advantageous as such a metal section may not be biocompatible. Thus, the present technology is particularly well suited if biocompatibility is desired.

The proximal diameter of the proximal section of the sealing element may generally correspond to the inner diameter of the channel.

In some embodiments, the channel may comprise a proximal channel section and a distal channel section, the distal channel section having an inner diameter smaller than the inner diameter of the proximal channel section. This may be particularly advantageous for housing capillaries with varying outer diameter. It will be understood that the diameter of the channel (sections) may generally correspond to the outer diameter of the capillary.

The proximal diameter of the proximal section of the sealing element may generally correspond to the diameter of the distal channel section.

The capillary may comprises a tube of a first material and a coating surrounding the tube. The tube may have a tube outer diameter and the tube with the coating may have a coating outer diameter, and the capillary may comprise a distal end section not comprising the coating and the inner diameter of the distal channel section may be smaller than the coating outer diameter.

Thus, a substantial section of the capillary may be protected by the coating, increasing the persistence of the capillary. However, at the distal section of the capillary, the coating may be omitted. Thus, only the central section of the capillary may be pressed against the sealing element, thus providing a particularly defined sealing. To protect the capillary (and particularly the section not comprising the coating), it may be advantageous to have the corresponding channel section being smaller and more closely corresponding to the outer diameter of this capillary section.

The tube may have an outer diameter in the range of 250 µm to 450 µm, such as 310 µm to 410 µm.

The first material may be fused silica.

The capillary may be formed of a capillary material and may comprise a distal section with a distal outer diameter and a proximal section with a proximal outer diameter. The proximal section may be proximal to the distal section, and the distal outer diameter may be smaller than the proximal outer diameter. In some such embodiment, the inner diameter of the distal channel section may be smaller than the proximal outer diameter of the capillary.

That is, in some embodiments, the capillary may have a distal end section having a reduced outer diameter. It will be understood that when a given force F is used to press the capillary distal section against the sealing element, there will be provided a sealing pressure P between these two elements. The sealing pressure P depends on the force and on the contact area between the sealing element and the capillary. Further, the smaller the diameter of the distal section of the capillary, the smaller this contact area. Thus, the smaller the diameter of the distal section, the smaller the sealing force that is necessary to arrive at a given sealing pressure. Thus, having a capillary with a reduced distal diameter may be advantageous, as it decreased the force necessary to generate a given sealing pressure.

The distal outer diameter may be in the range of 250 µm to 450 µm, such as 310 µm to 410 µm.

The capillary material may be metal, such as stainless steel, titanium, or MP35N.

In a second embodiment, the present technology also generally relates to a plug unit. This plug unit comprises a capillary, a sealing element, a housing assembly comprising a thread as a connection mechanism, and a torque limitation assembly for limiting a torque supplied to the thread.

It will be understood that this embodiment can also be combined with the first embodiment. That is, any of the features mentioned above in connection with the first embodiment can also be employed with the second embodiment. As discussed, the torque limitation assembly may limit a torque with which the plug unit is screwed into a socket unit. The torque limitation assembly may also provide a (haptic) feedback to the user once a given torque is reached and further turning of the plug unit does not lead to the plug unit being screwed in more deeply, or more firmly into a the socket unit. By limiting the torque, damage on different components (including the thread) may be prevented.

The torque limitation assembly may comprise a plurality of ridges on the housing assembly and a torque limitation element that surrounds the housing assembly. The torque limitation element may comprise a plurality of engagement elements on its inner diameter, and the torque engagement elements may be configured to engage the ridges up to a predetermined torque and to bend and slide over the ridges if a torque greater than the predetermined torque is applied.

The torque limitation assembly may be configured to limit the torque only in one rotational direction. Thus, e.g., there may be a torque limitation when screwing in the plug unit, but there may be no such torque limitation when disconnecting the plug unit from a socket unit.

The torque limitation assembly may comprise a knurl. This may facilitate handling of the plug unit.

The plug unit may comprise any of the features discussed above in connection with the plug unit of the first embodiment.

Also, the plug unit of the first embodiment may comprise a torque limitation assembly as discussed in connection with the second embodiment.

The sealing element may be made of a polymer material, such as polyether ether ketone (PEEK), reinforced PEEK, polytetrafluoroethylene (PTFE), polyimide (e.g., Vespel), or polyamide-imide (e.g., Torlon).

The biasing element may be a spring.

The biasing element may be configured to supply a force of 10 N to 150 N, such as 15 N to 110 N.

The biasing element may be configured to supply a force of 10 N to 50 N, such as 20 N to 30 N.

In some embodiment, the biasing element may be configured to supply a force of 50 N to 150 N, such as 80 N to 120 N.

In other embodiments, the biasing element may be configured to supply a force of 20 N to 80 N, such as 40 N to 60 N.

The thrust piece may be made of metal, preferably of stainless steel or titanium.

The housing assembly may be made of metal, preferably of stainless steel or titanium.

The thrust transmission element may be made of metal, preferably of stainless steel or titanium.

The plug unit may be configured for use in high performance liquid chromatography.

The plug unit may be configured to assume a relaxed state wherein the capillary distal face does not supply a force greater than 10 N, and preferably not greater than 5 N to the sealing element, further preferably not greater than 1 N to the sealing element, such as the capillary distal face not supplying any force to the sealing element. Thus, the seal may not be pushed out by the force in the relaxed state.

The plug unit may be configured to assume the relaxed state when it is not connected to a socket unit.

In some embodiments, the capillary distal face does not contact the sealing element in the relaxed state.

The spring may have a spring constant in the range of 1 N/mm to 100 N/mm.

In some embodiments, the spring constant may be in the range of 1 N/mm to 10 N/mm, such as 2 N/mm to 6 N/mm.

In other embodiments, the spring constant may be in the range of 20 N/mm to 60 N/mm, such as 30 N/mm to 50 N/mm.

In still further embodiments, the spring constant may be in the range of 3 N/mm to 20 N/mm, such as 7 N/mm to 13 N/mm.

The present invention also relates to a system comprising a plug unit as discussed above, and a bushing unit for receiving the plug unit.

When the plug unit is received in the bushing unit, only a distal end of the sealing element may contact the bushing unit.

In some embodiments, the biasing element may be made of an elastomer, such as PEEK.

The present invention also relates to the use of the discussed plug unit or of the discussed system.

The use may be for high performance liquid chromatography.

The use may comprise conveying a liquid at an elevated pressure through the capillary.

The elevated pressure may be at least 300 bar, preferably at least 500 bar, further preferably at least 1,000 bar, such as at least 1,500 bar.

The use may comprise: inserting the plug unit into the bushing unit; the sealing element contacting a bottom section of the bushing unit; the capillary distal face abutting the sealing element; and the housing assembly being advanced further into the bushing unit, causing compression of the biasing element, and thus causing the capillary to be forced to the distal direction. Thus, there may be provided a sealing force between the capillary and the sealing element, which sealing force may only be present when the plug unit is connected to the bushing unit.

The use may further comprise the thrust piece abutting a distal abutment face and the biasing element assuming a compressed state when the thrust piece abuts the distal abutment face. Thus, there may be provided a pre-determined and defined compression of the biasing element and thus a defined force with which the capillary is pressed against the sealing element.

That is, generally, in some embodiments, the present invention provides a plug unit having a capillary being biased against a sealing element by a biasing element. The axial force required for sealing is provided thus by a biasing element (e.g., a spring) and is thus self-adjusting. The sealing is thus only provided on the front side and this may present an advantage versus WO2010133192. The spring force may start to act on the seal the moment turning-in is started. Further, no load may act on the sealing element as long as it is not turned-in. This may present the advantage that the seal does not have to be maintained especially well in the front thrust piece; a small undercut is sufficient to this effect. If the spring force acted on the seal when not turned in, the spring could press the seal out and/or the capillary would entrench itself into the seal. Such disadvantages are overcome by the present technology. As soon as the seal is turned in, additional tension is built up in the material, which results in compaction of the material and thus increased stability in the seal.

Generally, embodiments of the present technology may provide for a reliable sealing at pressures exceeding 1,000 bar without the use of an additional tool. That is, the user may use the plug unit of the present technology without using additional tools. In particular, the user may screw in the discussed plug unit with their finger and without using additional tools. The seal setting may be compensated via the spring. Further still, the present technology may further reduce the dead volume, and may be, in fact, really free from such dead volume. Further still, the present technology may provide a fully biocompatible solution if the capillaries are made of biocompatible material.

Thus, a reliable (high pressure, over 1000 bar up to 1500 bar or above) sealed connection mechanism is provided that may be used in a safe-to-use manner (predefinied sealing force) without using tools. This connection may be a particularly easy to use fingertight connection.

The present technology is also defined by the following numbered embodiments.

Below, reference will be made to plug unit embodiments. These embodiments are abbreviated by the letter "P" followed by a number. Whenever reference is herein made to "plug unit embodiments", these embodiments are meant.

P1. A plug unit comprising
a capillary comprising a capillary distal face;
a sealing element, wherein at least a portion of the sealing element is located distal from the capillary distal face; and
a biasing element configured to bias the capillary towards the sealing element.

P2. The plug unit according to the preceding embodiment, wherein the capillary comprises an outer diameter in the range of 150 μm to 1,000 μm, such as 500 μm to 1,000 μm.

P3. The plug unit according to any of the preceding embodiments, wherein the sealing element comprises a distal end with an outer diameter in the range of 1,000 μm to 1,400 μm.

P4. The plug unit according to any of the preceding embodiments, wherein the sealing element comprises an axial length in the range of 400 μm to 1,200 μm.

P5. The plug unit according to any of the preceding embodiments, wherein the plug unit further comprises a thrust piece.

P6. The plug unit according to the preceding embodiment, wherein the sealing element is fixed to the thrust piece.

That is, the sealing element may be fixed to the thrust piece, independent of any other component, i.e., the sealing element may be fixed to the thrust piece also when the plug unit is not connected to a socket unit.

P7. The plug unit according to any of the 2 preceding embodiments, wherein the sealing element is located at a distal end of the thrust piece, and preferably wherein at least a section of the sealing element is received in the thrust piece.

P8. The plug unit according to any of the 3 preceding embodiments, wherein the sealing element comprises a distal end face with a smaller outer diameter than an outer diameter of the distal end of the thrust piece.

P9. The plug unit according to any of the preceding embodiments with the features of embodiment P6, wherein the sealing element is fixed to the thrust piece by means of an undercut.

P10. The plug unit according to any of the 5 preceding embodiments, wherein the thrust piece comprises a distal section with a distal thrust piece diameter.

P11. The plug unit according to the preceding embodiment, wherein the distal section of the thrust piece has an axial length in the range of 4,000 μm to 11,000 μm.

P12. The plug unit according any of the 2 preceding embodiments, wherein the distal thrust piece diameter is in the range of 600 μm to 2,000 μm, such as 1,500 to 2,000 μm.

P13. The plug unit according to any of the 8 preceding embodiments, wherein the thrust piece surrounds the capillary, and wherein the capillary is configured to move axially with respect to the thrust piece.

P14. The plug unit according to any of the preceding embodiments, wherein the plug unit further comprises a housing assembly.

P15. The plug unit according to the preceding embodiment, wherein the housing assembly houses the biasing element.

P16. The plug unit according to any of the 2 preceding embodiments, wherein the housing assembly comprises a connection mechanism for connecting the plug unit to a socket unit.

P17. The plug according to the preceding embodiment, wherein the connection mechanism is a thread.

P18. The plug unit according to any of the 4 preceding embodiments, wherein the housing assembly comprises a first housing section and a second housing section.

P19. The plug unit according to the preceding embodiment and with the features of embodiment P16, wherein the connection mechanism is located on the first housing section.

P20. The plug unit according to any of the 2 preceding embodiments and with the features of embodiment P15, wherein the second housing section houses the biasing element.

P21. The plug unit according to any of the 3 preceding embodiments, wherein the second housing section has a greater outer diameter than the first housing section.

P22. The plug unit according to any of the 4 preceding embodiments, wherein the first housing section has an outer diameter in the range of 3,200 μm to 5,000 μm.

P23. The plug unit according to any of the 5 preceding embodiments, wherein the second housing section has an outer diameter in the range of 6,000 μm to 10,000 μm.

P24. The plug unit according to any of the preceding embodiments with the features of embodiments P5 and P14, wherein the housing assembly comprises a thrust piece receiving opening, and wherein at least a section of the thrust piece is received in the thrust piece receiving opening.

P25. The plug unit according to any of the preceding embodiments and with the features of embodiments P5 and P14, wherein the thrust piece is configured to move axially with respect to the housing assembly.

P26. The plug unit according to any of the preceding embodiments with the features of the penultimate embodiment and with the features of embodiment P10, wherein the thrust piece further comprises a proximal section with a proximal thrust piece diameter, wherein the proximal section is received in the thrust piece receiving opening, and wherein the thrust piece receiving opening comprises an inner diameter being greater than the proximal thrust piece diameter.

P27. The plug unit according to the preceding embodiment, wherein the housing assembly further comprises a distal section having an inner diameter being greater than the distal thrust piece diameter and smaller than the proximal thrust piece diameter, wherein preferably, the distal section of the housing assembly is flanged inwardly.

P28. The plug unit according to any of the two preceding embodiments, wherein the proximal thrust piece diameter is in the range of 2,100 μm to 3,100 μm.

P29. The plug unit according to any of the preceding embodiments, wherein the plug unit further comprises a thrust transmission element fixed to the capillary.

P30. The plug unit according to the preceding embodiment, wherein the thrust transmission element is configured to transmit an axial force from the biasing element to the capillary.

P31. The plug unit according to any of the 2 preceding embodiments, wherein the thrust transmission element is fixed to the capillary by crimping, gluing, a form fit, and/or a press fit.

P32. The plug unit according to any of the 3 preceding embodiments, wherein the thrust transmission element comprises an outer diameter in the range of 3,200 μm to 5,000 μm.

P33. The plug unit according to any of the 4 preceding embodiments, wherein the thrust transmission element comprises a proximal face configured to be subjected by an axial force of the biasing element.

P34. The plug unit according to any of the preceding embodiments with the features of embodiments P14 and P29, wherein the thrust transmission element is located inside the housing assembly.

P35. The plug unit according to any of the preceding embodiments with the features of embodiment P5, wherein the sealing element protrudes distally from the thrust piece.

P36. The plug unit according to any of the preceding embodiments, wherein the sealing element comprises a distal section with a distal diameter and a proximal section with a proximal diameter, the proximal diameter being smaller than the distal diameter.

P37. The plug unit according to the preceding embodiment, wherein the proximal diameter is at least 10% smaller than the distal diameter.

P38. The plug unit according to any of the preceding embodiments and with the features of embodiment P5, wherein the thrust piece comprises a channel for receiving the capillary.

P39. The plug unit according to the preceding embodiment, wherein the channel has a uniform diameter.

P40. The plug unit according to any of the preceding embodiments, wherein the capillary comprises a uniform outer diameter.

P41. The plug unit according to the preceding embodiment, wherein the uniform outer diameter is in the range of 740 μm to 840 μm or in the range of 500 μm to 700 μm.

P42. The plug unit according to any of the 2 preceding embodiments, wherein the capillary comprises fused silica; PEEK; and/or metal, such a stainless steel, MP35N, or titanium; and is preferably realized as a metal capillary with inner PEEK coating.

P43. The plug unit according to embodiment P38, wherein the channel comprises a uniform inner diameter.

P44. The plug unit according to the preceding embodiment and with the features of embodiment P36, wherein the proximal diameter of the proximal section of the sealing element generally corresponds to the inner diameter of the channel.

P45. The plug unit according to embodiment P38, wherein the channel comprises a proximal channel section and a distal channel section, the distal channel section having an inner diameter smaller than the inner diameter of the proximal channel section.

P46. The plug unit according to the preceding embodiment and with the features of embodiment P36, wherein the proximal diameter of the proximal section of the sealing element generally corresponds to the diameter of the distal channel section.

P47. The plug unit according to any of the 2 preceding embodiments, wherein the capillary comprises a tube of a first material and a coating surrounding the tube, the tube having a tube outer diameter and the tube with the coating having a coating outer diameter, wherein the capillary comprises a distal end section not comprising the coating and wherein the inner diameter of the distal channel section is smaller than the coating outer diameter.

P48. The plug unit according to the preceding embodiment, wherein the tube has an outer diameter in the range of 250 μm to 450 μm, such as 310 μm to 410 μm.

P49. The plug unit according to any of the 2 preceding embodiments, wherein the first material is fused silica.

P50. The plug unit according to any of the embodiments P45 and P46, wherein the capillary is formed of one material and comprises a distal section with a distal outer diameter and a proximal section with a proximal outer diameter, the proximal section being proximal to the distal section, the distal outer diameter being smaller than the proximal outer diameter, and wherein the inner diameter of the distal channel section is smaller than the proximal outer diameter of the capillary.

P51. The plug unit according to the preceding embodiment, wherein the distal outer diameter is in the range of 250 µm to 450 µm, such as 310 µm to 410 µm.

P52. The plug unit according to any of the 2 preceding embodiments, wherein the material is metal, such as stainless steel, titanium, or MP35N.

Below, reference will be made to torque limitation embodiments. These embodiments are abbreviated by the letter "T" followed by a number. Whenever reference is herein made to "torque limitation embodiments", these embodiments are meant.

T1. A plug unit comprising
a capillary;
a sealing element;
a housing assembly comprising a thread as a connection mechanism; and
a torque limitation assembly for limiting a torque supplied to the thread.

T2. The plug unit according to the preceding embodiment, wherein the torque limitation assembly comprises a plurality of ridges on the housing assembly and a torque limitation element surrounding the housing assembly, the torque limitation element comprising a plurality of engagement elements on its inner diameter, wherein the torque engagement elements are configured to engage the ridges up to a predetermined torque and to bend and slide over the ridges if a torque greater than the predetermined torque is applied.

T3. The plug unit according to any of the 2 preceding embodiments, wherein the torque limitation assembly is configured to limit the torque only in one rotational direction.

T4. The plug unit according to any of the 3 preceding embodiments, wherein the torque limitation assembly comprises a knurl.

T5. The plug unit according to any of the 4 preceding embodiments, wherein the plug unit comprises any of the features of the preceding plug unit embodiments.

P53. The plug unit according to any of the preceding plug unit embodiments, wherein the plug unit comprises a torque limitation assembly according to any of the preceding torque limitation embodiments.

P54. The plug unit according to any of the preceding plug unit embodiments, wherein the sealing element is made of a polymer material, such as polyether ether ketone (PEEK), reinforced PEEK, polytetrafluoroethylene (PTFE), polyimide (e.g., Vespel), or polyamide-imide (e.g., Torlon).

P55. The plug unit according to any of the preceding plug unit embodiments, wherein the biasing element is a spring.

P56. The plug unit according to any of the preceding plug unit embodiments, wherein the biasing element is configured to supply a force of 10 N to 150 N, such as 15 N to 110 N.

P57. The plug unit according to any of the plug unit preceding embodiments and with the features of embodiment P47 or P50, wherein the biasing element is configured to supply a force of 10 N to 50 N, such as 20 N to 30 N.

P58. The plug unit according to embodiment P56 and with the features of embodiment P40, wherein the biasing element is configured to supply a force of 50 N to 150 N, such as 80 N to 120 N.

P59. The plug unit according to embodiment P56 and with the features of embodiment P40, wherein the biasing element is configured to supply a force of 20 N to 80 N, such as 40 N to 60 N.

P60. The plug unit according to any of the preceding plug unit embodiments and with the features of embodiment P5, wherein the thrust piece is made of metal, preferably of stainless steel or titanium.

P61. The plug unit according to any of the preceding plug unit embodiments and with the features of embodiment P14, wherein the housing assembly is made of metal, preferably of stainless steel or titanium.

P62. The plug unit according to any of the preceding plug unit embodiments and with the features of embodiment P29, wherein the thrust transmission element is made of metal, preferably of stainless steel or titanium.

P63. The plug unit according to any of the preceding plug unit embodiments, wherein the plug unit is configured for use in high performance liquid chromatography.

P64. The plug unit according to any of the preceding embodiments, wherein the plug unit is configured to assume a relaxed state wherein the capillary distal face does not supply a force greater than 10 N, and preferably not greater than 5 N to the sealing element, further preferably not greater than 1 N to the sealing element, such as the capillary distal face not supplying any force to the sealing element.

P65. The plug unit according to the preceding embodiment, wherein the plug unit is configured to assume the relaxed state when it is not connected to a socket unit.

P66. The plug unit according to any of the 2 preceding embodiments, wherein the capillary distal face does not contact the sealing element in the relaxed state.

P67. The plug unit according to any of the preceding embodiments with the features of embodiment P55, wherein the spring has a spring constant in the range of 1 N/mm to 100 N/mm.

P68. The plug unit according to the preceding embodiment and with the features of embodiment P47 or P50, wherein the spring constant is in the range of 1 N/mm to 10 N/mm, such as 2 N/mm to 6 N/mm.

P69. The plug unit according to the penultimate embodiment and with the features of embodiment P40, wherein the spring constant is in the range of 20 N/mm to 60 N/mm, such as 30 N/mm to 50 N/mm.

P70. The plug unit according to embodiment P67 and with the features of embodiment P40, wherein the spring constant is in the range of 3 N/mm to 20 N/mm, such as 7 N/mm to 13 N/mm.

P71. The plug unit according to any of the preceding embodiments, wherein the biasing element is made of an elastomer, such as PEEK.

Below, reference will be made to system embodiments. These embodiments are abbreviated by the letter "S" followed by a number. Whenever reference is herein made to "system embodiments", these embodiments are meant.

S1. A system comprising
a plug unit according to any of the preceding plug unit embodiments, and
a bushing unit for receiving the plug unit.

S2. The system according to the preceding embodiment, wherein
when the plug unit is received in the bushing unit, only a distal end of the sealing element contacts the bushing unit.

Below, reference will be made to use embodiments. These embodiments are abbreviated by the letter "U" followed by a number. Whenever reference is herein made to "use embodiments", these embodiments are meant.

U1. Use of the plug unit according to any of the preceding plug unit embodiments or of the system according to any of the preceding system embodiments.

U2. The use according to the preceding embodiment, wherein the use is for high performance liquid chromatography.

U3. The use according to any of the preceding use embodiments, wherein the use comprises conveying a liquid at an elevated pressure through the capillary.

U4. The use according to the preceding embodiment, wherein the elevated pressure is at least 300 bar, preferably at least 500 bar, further preferably at least 1,000 bar, such as at least 1,500 bar.

U5. The use according to any of the preceding use embodiments with the features of embodiments P14 and S1, wherein the use comprises
- inserting the plug unit into the bushing unit;
- the sealing element contacting a bottom section of the bushing unit;
- the capillary distal face abutting the sealing element; and
- the housing assembly being advanced further into the bushing unit, causing compression of the biasing element, and thus causing the capillary to be forced to the distal direction.

U6. The use according to the preceding embodiment and with the features of embodiment P5, wherein the use further comprises
- the thrust piece abutting a distal abutment face and the biasing element assuming a compressed state when the thrust piece abuts the distal abutment face.

BRIEF DESCRIPTION OF THE DRAWINGS

Embodiments of the invention will now be described with reference to the accompanying drawings. These embodiments should only exemplify, but not limit, the present invention.

FIG. 4 depicts a detail of the first embodiment;

FIG. 5 depicts a plug unit according to a second embodiment in a first state;

FIG. 6 depicts the plug unit of the second embodiment in a second state;

FIG. 13 depicts exemplary dimensions of a plug unit, which dimensions may be used in any of the embodiments.

DETAILED DESCRIPTION OF EMBODIMENTS

Figure 1:
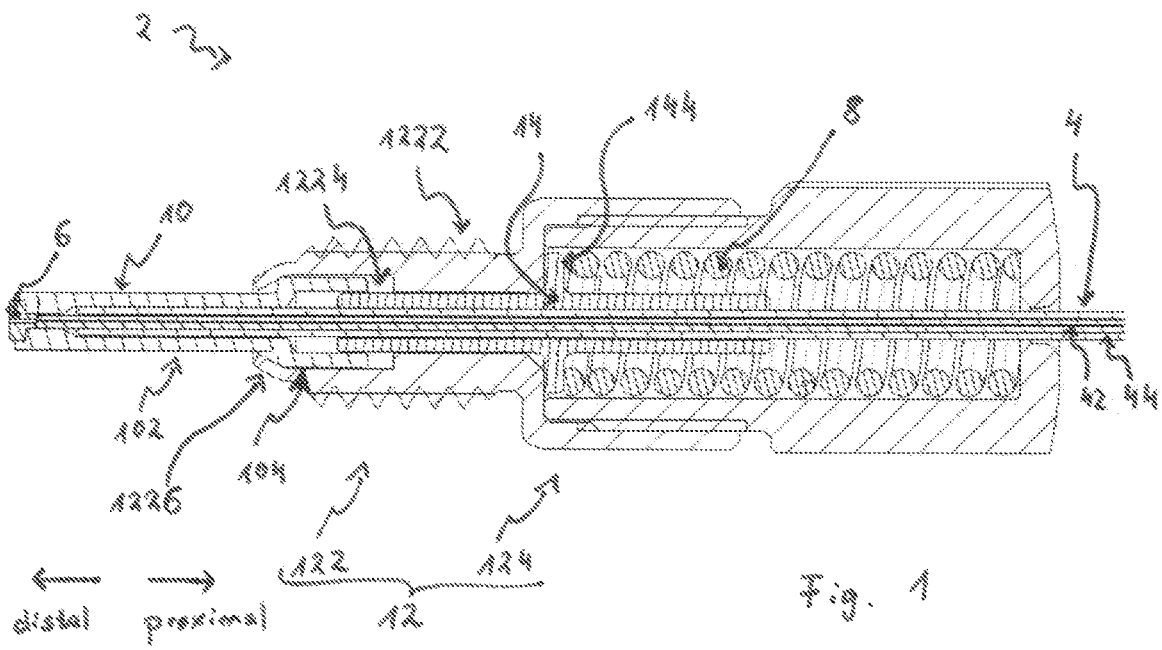
FIG. 1 depicts a plug unit according to a general embodiment.

In one embodiment, the invention relates to a plug unit 2. Very generally, the plug unit comprises a capillary 4, a sealing element 6, and a biasing element 8, such as a spring 8. Throughout the description, the terms proximal and distal will be used. Distal denotes a section that is further away from the center of the capillary 4 than another (i.e., further away than a more proximal section). That is, in the embodiment depicted in FIG. 1, the sealing element 6 is the most distal section of the plug unit 2. In FIG. 1, the further left an element is, the more distal it is (and the further right it is, the more proximal it is). Distal may also be used interchangeably with the term "forward", i.e., a distal section may also be referred to as a forward section.

Figure 7:
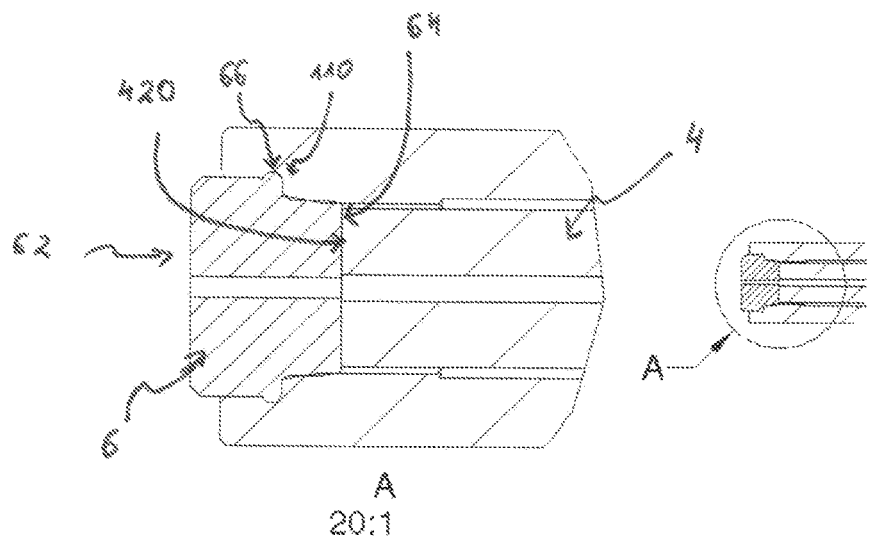
FIG. 7 depicts a detail of the plug unit of the second embodiment.

Reference will now be made to FIG. 7, depicting a section of an embodiment of the present invention in more detail. In particular, this Figure depicts a distal section of a plug unit 2, which includes a section of the capillary 4 and the sealing 6. The capillary 4 comprises a distal end face 420, which may also be referred to as the capillary distal face 42. This capillary distal face 420 typically is the most distal portion of the capillary 4. As depicted, the sealing element 6 (or at least a portion thereof) is located distal from the capillary distal face 420. With reference again to FIG. 1, it will be understood that the biasing element 8 may bias (i.e., tension) the capillary 4 towards the sealing element 6.

Figure 2:
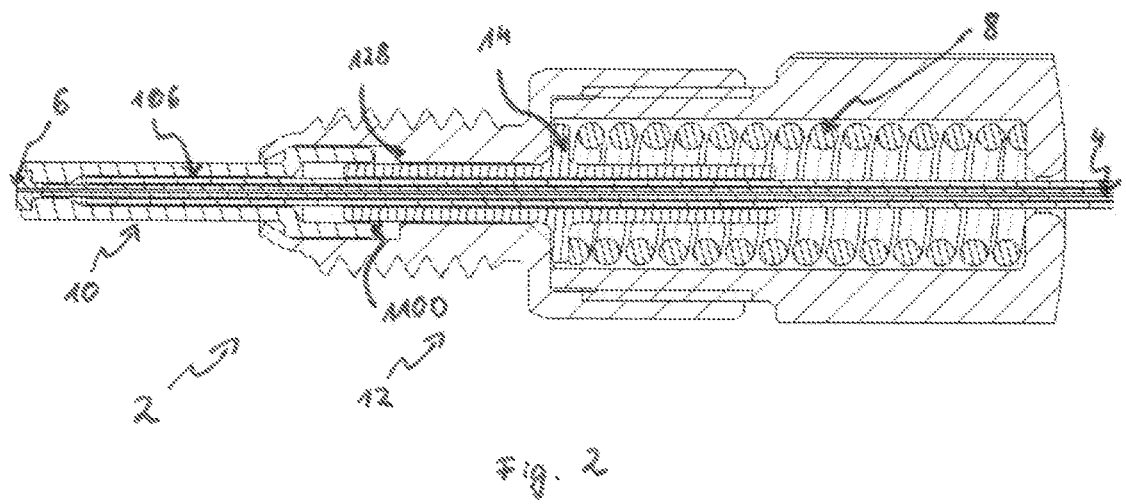
FIG. 2 depicts a plug unit according to a first embodiment in a first state.
Figure 3:
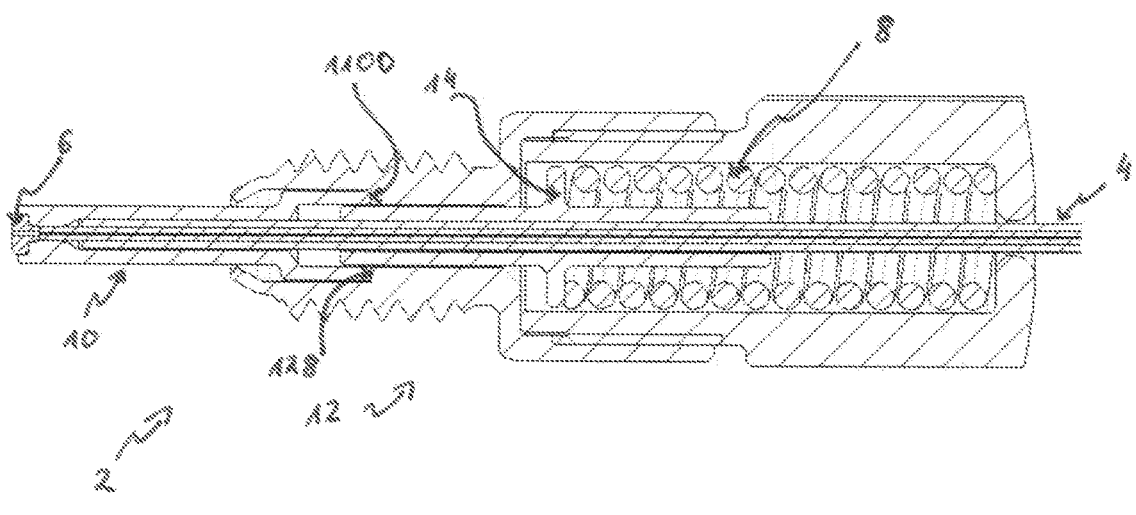
FIG. 3 depicts the plug unit of the first embodiment in a second state.

One possible advantage of this embodiment will be discussed further with reference to FIGS. 2 and 3. FIG. 2 depicts a configuration of an embodiment of the present invention in a non-connected state (i.e., when the plug unit 2 is not connected to a socket unit) and FIG. 3 depicts this embodiment in a connected state (i.e. when the plug unit 2 is connected to a socket unit). It will be appreciated that the biasing element 8 is more compressed in FIG. 3 than in FIG. 2, which is why the state in FIG. 3 is also referred to as the tensioned state and the state in FIG. 2 is also referred to as the un-tensioned state.

When the depicted plug unit 2 is secured to a socket unit (not depicted), which may also be referred to as a bushing unit (also see in this regard, e.g., WO 2010/133192 A1, FIG. 1), the sealing element 6 will contact a bottom section of a receiving opening. More specifically, a distal face 62 (see FIG. 4) will contact a bottom surface of the receiving opening of the socket unit and will seal. When further inserting the plug unit 2 (e.g., by screwing it in), there may be provided additional tension to the biasing element 8, and thus to the capillary 4. The capillary 4 may thus be forced forward (or towards the distal direction). The capillary 4 may thus be tensioned or forced against a proximal face 64 of the sealing element 6 (see FIG. 4). In turn, the sealing element 6 may be forced against the bottom of the receiving opening of the socket unit. When further screwing in the plug unit 2 into the socket unit, a thrust piece 10 to which the sealing element 6 is connected may slide inside a housing assembly 12 until a proximal face 1100 (see FIGS. 2 and 3) of the thrust piece 10 abuts a proximal abutment face 128 of the housing assembly 12—see FIG. 3 in this regard. Thus, an axial force will be transmitted from the housing assembly 12 to the thrust piece 10 and thus to the seal 6, which may provide a sealing force pressing the distal face 62 of the sealing element against a bottom portion of the socket unit. However, alternatively, the seal could be formed so that the biasing element 8, e.g., the spring transmits the axial force directly to the front side (i.e., the distal end 62) of the seal 6; in this case, the spring force would seal twice—once internally and once externally. In such variants, the thrust piece 10 would not abut the abutment face 128, but instead the distal force would be provided by the biasing element 8 to the sealing element 6. Generally, by means of any of these mechanisms, a sealing force may be provided. This generally corresponds to the configuration depicted in FIG. 3.

However, in the unconnected state, i.e., when the plug unit 2 is not connected to a socket unit (see FIG. 2), the biasing element 8 (e.g., the compression spring 8) may be less compressed. Thus, the capillary 4 may be biased towards the sealing element 6 with a smaller force. Furthermore, as depicted in FIG. 2, there may also be provided a housing 12 comprising an abutment surface limiting the distal position of the capillary vis-à-vis the housing 12.

This may be advantageous for the following reason: In the unconnected state (e.g., FIG. 2), there may be provided no contact between the capillary 4 and the sealing element 6, or (if such a contact is provided), the force with which the capillary 4 abuts the sealing element 6 is substantially lower than in the connected state (FIG. 3). This decreases the risk of the capillary 4 pushing out the sealing element 6 in the unconnected state (FIG. 2), while still allowing for a substantial sealing force in the connected state (FIG. 3).

Further details of the depicted embodiments will now be described. Throughout the drawings and the description of the Figures, like reference numerals denote like structures. For sake of clarify of illustration, not all reference numerals are included in all of the drawings. Similarly, not all the structures will be described for every embodiment. On the contrary, for some embodiments, only the differences to the other embodiments will be described.

More particularly referring to FIG. 1, this Figure depicts an embodiment of a plug unit 2 comprising a capillary 4, a sealing element 6 and a biasing element 8 as described before.

The depicted plug unit 2 also comprises a thrust piece 10 surrounding the distal end of the capillary 4. The capillary 4 may "slide" inside the thrust piece 10, i.e., it may change its axial location with respect to the thrust piece 10.

Proximal to the thrust piece 10, there is a housing assembly 12 comprising a first housing section 122 and a second housing section 124. The housing assembly 12 (e.g., the first housing section 122) may comprise a connection mechanism 1222 for securing the plug unit 2 to a socket unit. In the depicted embodiment, the connection mechanism 1222 is realized as a thread, but it will be understood that other connection mechanisms 1222 (such as a bayonet connection mechanism or a snap-fit connection mechanism) can also be used. As depicted, the housing assembly 12 (e.g., the second housing section 124) may house the biasing element 8.

A proximal portion of the thrust piece 10 may be located in the housing assembly 12 and may slide (i.e., change its axial position) with respect to the housing assembly 12. More particularly, the thrust piece 10 may comprise a first (distal) portion 102 comprising a first thrust portion outer diameter and a second (proximal) portion 104 with a second thrust portion outer diameter, the second thrust portion outer diameter being greater than the first thrust portion outer diameter. The housing assembly 12 (which may also simply be referred to as housing) may comprise a thrust piece receiving opening 1224. The thrust piece receiving opening 1224 comprises a first section with an inner opening diameter greater than the second thrust portion outer diameter. Further, the thrust piece receiving opening 1224 comprises a second section with an inner opening diameter smaller than the second thrust portion outer diameter. In the depicted embodiment, the second section is distal to the first section. For example, the second section may be formed by a distal section 1226 of the housing assembly 12 being inwardly crimped, inwardly folded and/or inwardly flanged. Thus, the thrust piece 10 may slide inside the housing assembly 122, but cannot fall out of this housing assembly 122. In the depicted embodiment, the first housing section 122 comprises the thrust piece receiving opening 1224.

The depicted plug unit 2 also comprises a thrust transmission element 14. The thrust transmission element 14 is configured and located to transmit an axial force from the biasing element 8 to the capillary 4. The thrust transmission element 14 is fixedly connected to the capillary 4. In particular, the thrust transmission element 14 has a fixed axial position on the capillary 4, and the capillary 4 cannot slide with respect to the thrust transmission element. For example, the thrust transmission element 14 may be crimped onto the capillary 14.

The thrust transmission element 14 may comprise a proximal facing thrust face 144 configured to be subjected with a biasing force of the biasing element 8. Thus, the above described sealing effect may be achieved.

The thrust transmission element 14 may slide inside the housing assembly 12, i.e., it may change its axial position with respect to the housing assembly 12.

The below table summarizes exemplary values for different elements of the discussed embodiments. For a further explanation of the different elements, also see FIG. 13.

| Number | Explanation | Exemplary Range/μm | Examplary value/μm |
|---|---|---|---|
| D4 | Outer diameter of the capillary 4 | 150 to 1,000 | 800 |
| D6 | Outer diameter of the sealing element 6 | 1,000 to 1,400 | 1,200 |
| L6 | Axial length of the sealing element 6 | 400 to 1,200 | 800 |
| D102 | Outer diameter of the first section 102 of the thrust piece 10 | 600 to 2,000 | 1,600 or 1,650 |
| D104 | Outer diameter of the second section 104 of the thrust piece 10 | 2,100 to 3,100 | 2,600 |
| L102 | Axial length of the first section 102 of the thrust piece 10 | 4,000 to 11,000 | 7,400 |
| D122 | Outer diameter of the first housing section 122 | 3,200 to 5,000 | 4,000 |
| D124 | Outer diameter of the second housing section 124 | 6,000 to 10,000 | 8,000 |
| D14 | Outer diameter of the thrust transmission element 14 | 3,200 to 5,000 | 4,000 |

With particular reference to FIGS. 1 to 4 again, the capillary 4 in this embodiment may be a fused silica capillary 4. That is, the capillary 4 may comprise a tube 42 formed of silica and a protective coating 44—see particularly FIGS. 1 and 4 in that regard. For example, the coating 44 may be made of PEEK. The coating 44 may have an outer diameter in the range of 500 μm to 1,000 μm, such as 740 μm to 840 μm, e.g., 790 μm. An inner diameter of the coating may be 310 μm to 510 μm, such as 400 μm to 420 μm, such as 410 μm. The capillary 4 may have an inner diameter in the range of 5 μm to 200 μm, such as 10 μm to 150 μm (e.g., around 50 μm). The tube 42 may have an outer diameter in the range of 200 μm to 450 μm, such as 350 μm to 370 μm. As depicted in FIG. 4, in some embodiments, the coating 44 does not extend to the distal end of the capillary 4. Instead, the capillary 4 may have a distal portion not comprising the coating 44. This may provide a particularly defined abutment of the capillary 4 to the sealing element 6.

Further, the thrust piece 10 generally comprises a channel 106 for receiving the capillary 4 (see FIGS. 2 and 4). In the embodiment depicted in FIGS. 1 to 4, the channel 106 comprises a first section 1062 and a second section 1064, the second section 1064 being the distal section of the channel. The first channel section 1062 comprises a diameter for receiving the capillary 4 including the coating 44, e.g., it may comprise an inner diameter of 500 μm to 1,000 μm, e.g., about 800 μm. The second channel section 1064 may comprise an inner diameter that is smaller than the inner diameter of the first channel section 1062. For example, it may comprise an inner diameter that is greater than the outer diameter of the tube 42, but smaller than the outer diameter of the capillary 4 with the coating 44. Exemplary values for the inner diameter of the second channel section 1064 may be 200 μm to 450 μm, such as 350 μm to 370 μm.

As is also depicted in FIG. 4, the sealing element 6 may comprise a proximal face 64 having an outer diameter being smaller than the outer diameter of distal face 62 the sealing element 6. The outer diameter of the proximal face 64 may generally correspond to the outer diameter of the tube 42, e.g., the proximal face 64 may have an outer diameter in the range of 200 μm to 450 μm, such as 350 μm to 370 μm.

Further, as depicted in FIG. 4 (also see FIG. 13), the sealing element 6 may comprise an outer diameter D6 being smaller than the outer diameter D102 of a distal portion of the thrust piece 10. The difference may be 200 μm to 800 μm, such as 400 μm to 600 μm. Thus, when the plug unit 2 is inserted into a socket unit, the sealing element 6 may only seal with its distal face, and no sealing may be provided with the circumferential section of the sealing element 6, thus enabling a simpler insertion into and removal from a socket unit.

As can also be seen in FIG. 4, the thrust piece 10 may receive the sealing element 6. Furthermore, the thrust piece 10 may comprise an undercut 110 and the sealing element 6 may comprise a corresponding bump 66 (which may also be referred to as a section with increased diameter) corresponding to the undercut 110.

Thus, the sealing element 6 may be easily secured in the thrust piece 10. Such an easy connection may in particular be facilitated by the described biasing mechanism: As discussed, the capillary 4 may only be forced against the sealing element 6 (or such a sealing force may be substantially larger) when the plug unit 2 is connected to a socket unit and the sealing element 6 is pushed against a bottom part of the socket unit. However, in the un-connected state, this may not be the case (i.e., the force supplied from the capillary 4 to the sealing element 6 may be substantially smaller or, in fact, 0). Thus, the capillary 4 does not push out the sealing element 6 in the un-connected state, and thus a simple connection (such as the undercut) between the sealing element 6 and the thrust-piece may be sufficient.

FIGS. 5 to 7 depict a further embodiment of the present technology—again, FIG. 5 depicts an un-connected and un-tensioned state, FIG. 6 depicts a connected and tensioned state and FIG. 7 depicts a detail of the embodiment. The embodiment greatly corresponds to the embodiment discussed above with respect to FIGS. 1 to 4. However, the capillary 4 in FIGS. 5 to 7 may be formed of metal, such as stainless steel. It may comprise an outer diameter as discussed above (e.g., 790 μm). It may comprise an inner diameter of 20 μm to 700 μm, such as 50 μm to 500 μm. In some embodiments, the metal capillary 4 does not comprise a coating.

As depicted in FIG. 7, the sealing element 6 may comprise a proximal face 64 having an outer diameter generally corresponding to the outer diameter of the capillary 4, e.g., the outer diameter of the proximal face 64 of the sealing element 6 may be 500 μm to 1,000 μm.

Figure 8:
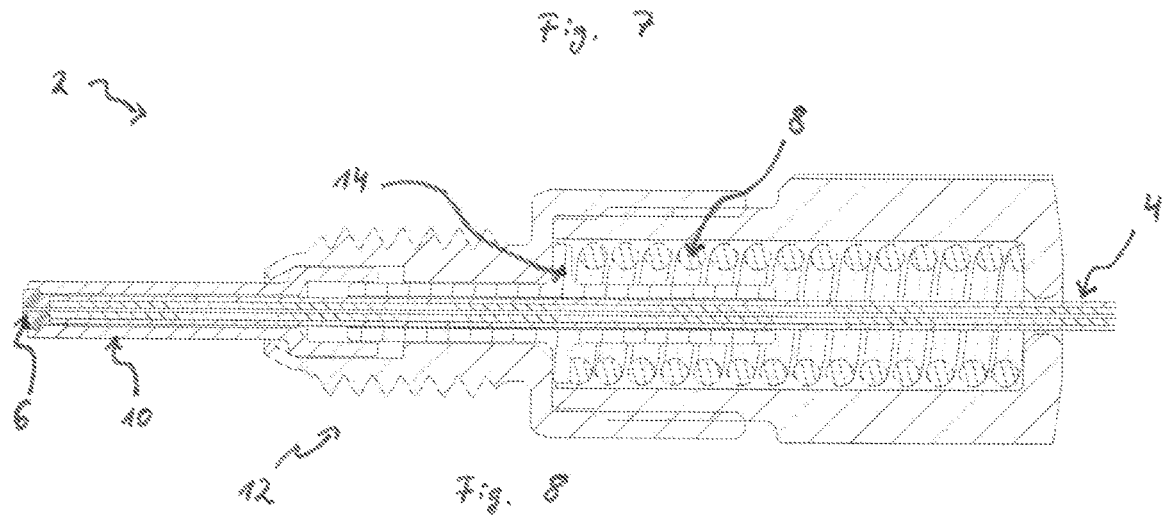
FIG. 8 depicts a plug unit according to a third embodiment.
Figure 9:
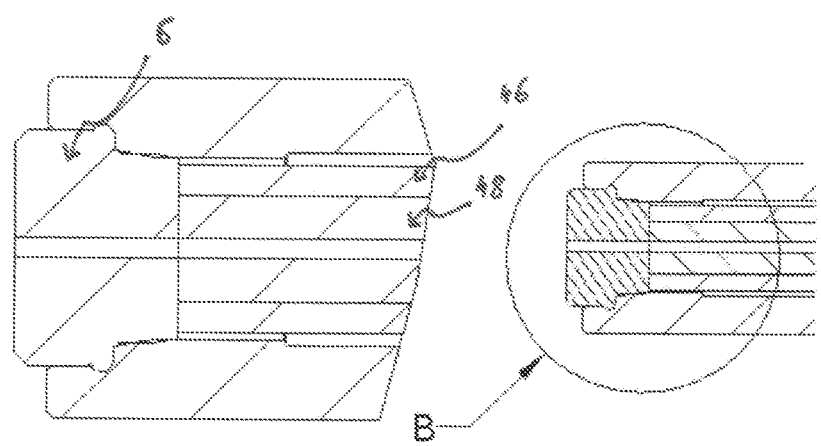
FIG. 9 depicts a detail of the plug unit of the third embodiment.

A still further variant of the present technology is depicted in FIGS. 8 and 9. This embodiment greatly corresponds to the embodiment depicted in FIGS. 5 to 7. One difference is that (unlike the embodiment in FIGS. 5 to 7), the capillary 4 comprises an inner layer 48 of a plastic material, e.g., polyether ether ketone (PEEK) and an outer layer of metal, e.g., steel, preferably stainless steel. Other than that, the same considerations and dimensions as above apply.

It is noted that the present technology may be a very good solution for internally coated steel capillaries 4, such as the capillary depicts in FIGS. 8 and 9, as the front side of the capillary 4 (i.e., the distal face) presses directly onto the seal 6 and thus all fluidic parts are free from metal and consequently biocompatible. That is, if a fluid is conveyed in a system comprising such a plug unit, the fluid will only come into contact with the PEEK material of the capillary 4, but not with the metallic material.

Figure 10:
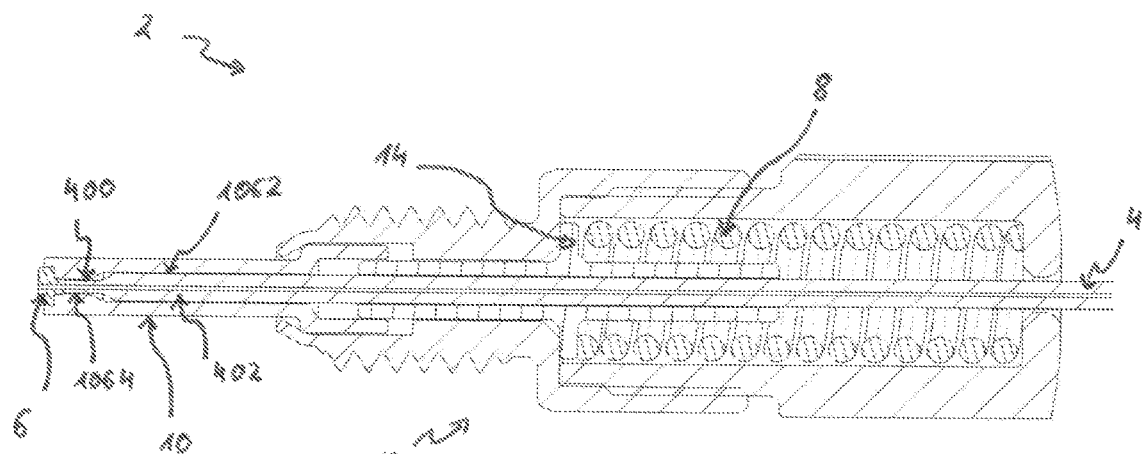
FIG. 10 depicts a plug unit according to a fourth embodiment.
Figure 11:
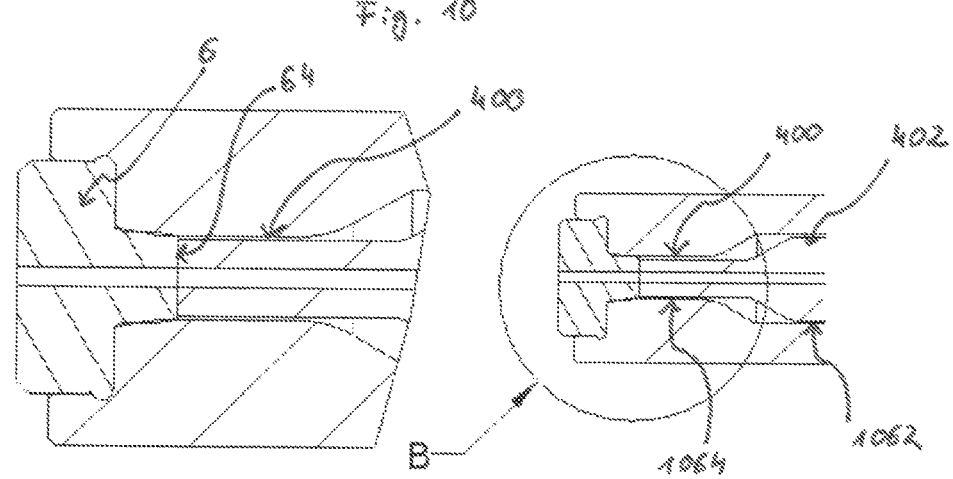
FIG. 11 depicts a detail of the plug unit according to the fourth embodiment.

Another variant of the present technology is depicted in FIGS. 10 and 11. Again, this embodiment mostly corresponds to the embodiment depicted in FIGS. 5 to 7, and it also comprises a capillary 4 made of metal, e.g., steel, such as stainless steel. However, different from the embodiment depicted in FIGS. 5 to 7 (where the capillary 4 comprises a constant outer diameter along its length), the capillary 4 in FIGS. 10 and 11 comprises a distal end portion 400 having a smaller outer diameter than a portion 402 of the capillary 4 that is more proximal.

More particularly, the distal end portion 400 may have an outer diameter in the range of 200 μm to 450 μm, such as 350 μm to 370 μm, and the remainder (put differently: the more proximal portion 402 of the capillary 4) may have an outer diameter in the range of 500 μm to 1,000 μm. Again (similar to the embodiment depicted in FIGS. 1 to 4), the sealing element 6 may have a proximal face 64 having an outer diameter corresponding to the outer diameter of the distal end portion 400 of the capillary. Further (and also similar to the embodiment depicted in FIGS. 1 to 4), the thrust piece 10 may also comprise a channel 106 with a first section 1062 and a second section 1064, the second section 1064 being the distal section of the channel. The first channel section 1062 comprises a diameter for receiving the more proximal portion 402 (which may also be referred to as the main portion 402), e.g., it may comprise an inner diameter of 500 μm to 1,000 μm, e.g., about 800 μm. The second channel section 1064 may comprise an inner diameter that is smaller than the inner diameter of the first channel section 1062. For example, it may comprise an inner diameter that is greater than the outer diameter of the distal end portion 400 of the capillary 4, but smaller than the outer diameter of the main portion 402 of the capillary. Exemplary values for the inner diameter of the second channel section 1064 may be 200 μm to 450 μm, such as 350 μm to 370 μm.

Having a distal end portion 400 of the capillary with a reduced outer diameter may be advantageous for the following reason: It will be understood that the pressure the capillary 4 transmits to the sealing element 6 is inversely proportional to the contact surface between the capillary 4 and the sealing element 6. Thus, having a reduced diameter leads to a higher pressure with which the capillary 4 is pressed against the sealing element 6. Thus, a smaller force supplied by the biasing element 8 may be sufficient to reach a given sealing pressure. Thus, only a smaller force may be necessary to render the plug unit safe for usage with high pressures (such as the pressures occurring during HPLC).

Put differently, FIGS. 10 and 11 may relate to an embodiment comprising a metal (such as steel) capillary 4 which could be ground off at the ends, e.g. from 0.79 mm to e.g. 360 μm, or reduced in any other way. This may have the advantage of a biasing element 8 (e.g., spring) with a lower force being sufficient in order to maintain a given pressure, e.g., of 1,500 bar.

A typical use scenario of the present technology will now be described with exemplary reference to FIGS. 1 to 4 (though it may also apply to the other discussed embodiments). As discussed, FIG. 2 depicts the plug unit 2 in its non-connected and relaxed state. When connecting this plug unit 2 to a (non-depicted) socket unit, the sealing element 6 contacts a bottom portion of the socket unit. When now screwing in the housing assembly 12, the housing assembly 12 will be moved more deeply into the socket unit. Via the biasing element 8 and the thrust transmission element 14, there is also provided a force to the capillary 4 forcing it to the distal direction. Thus, the capillary 4 will be pressed forward to come into abutment with the sealing element 6. When further screwing in the plug unit 2 into the socket unit, the plug unit 2 will be moved more deeply into the socket unit. As the capillary 4 is already in abutment with the sealing element 6, it cannot move further in the distal direction. The same applies to the thrust transmission element 14, as this thrust transmission element 8 is fixed to the capillary 4. Thus, further screwing in the plug unit 2 leads to a compression of the biasing element 8. Thus, the force with which the capillary 4 is pressed against the sealing element 6 increases. This may also lead to the sealing element 6 being pressed more firmly to a bottom section of the socket unit and thus providing a sealing between the sealing element 6 and the socket unit. The further the plug unit 2 is screwed into the socket unit, the more the biasing element 8 will be compressed, and the higher the force with which the capillary 4 is pressed against the sealing element 6. This applies up to a point where the proximal face 1100 of the thrust piece 10 comes into contact with an abutment face 128 of the housing assembly 12 (see, e.g., FIG. 3). That is, this applies to configurations in between the configurations depicted in FIGS. 2 and 3.

Once the configuration of the thrust piece 10 abutting the abutment face 128 is reached (see, e.g., FIG. 3), when further screwing in the plug unit 2, there will also be provided an additional force pressing the thrust piece 10 to the distal direction. That is, in this configuration, further tightening the plug unit 2 to the socket unit will lead to a force being transmitted from the housing 12 to the thrust piece 10 and to the sealing element 6. Thus, there may be provided a sealing force between the sealing element 6 and the socket unit. It will further be understood that in the configuration of FIG. 3, further screwing in the plug unit 2 will typically not lead to a further compression of the biasing element 8. Thus, in this configuration, there is a defined compression of the biasing element 8, and thus a defined sealing force between the capillary 4 and the sealing element 6. It will be understood that the described embodiments may be advantageous for different reasons. As discussed, there may be provided a contact between the capillary distal face 420 and the sealing element 6, and thus a sealing between these elements, when the plug unit 2 is connected to a socket unit; but such a contact may not be present (or only be present without there actually being a strong force between these elements) when the plug unit 2 is not connected to a socket unit. This may lead to a massive reduction of dead volume, allow for a good sealing, and not subject the sealing element 6 (in the unconnected state) to a force that needs to be compensated for. Further, the biasing element 8 may also provide a "self-adjusting" effect. That is, in the configuration between the configurations depicted in FIGS. 2 and 3, the force with which the capillary 4 is pressed against the sealing element 6 (when the plug unit 2 is connected to a socket unit) may only alter gradually with the position of the housing assembly 12 vis-à-vis the socket unit. That is, a change of the position of the housing assembly 12 may only alter the sealing force between the sealing element 6 and the capillary 4 marginally. Thus, such small changes (that may occur during operation) do not have a big impact on the sealing, rendering the sealing more durable and safer, and thus increasing user friendliness. Further, once the configuration of FIG. 3 is reached, there may be provided a defined sealing force between the capillary 4 and the sealing element 6, which depends on the maximum compression of the biasing element 8 (which typically is defined by the distance the thrust piece 10 travels before reaching the abutment surface 128) and characteristics of the biasing element 8 (e.g., its spring constant if the biasing element 8 is realized as a spring).

Figure 12:
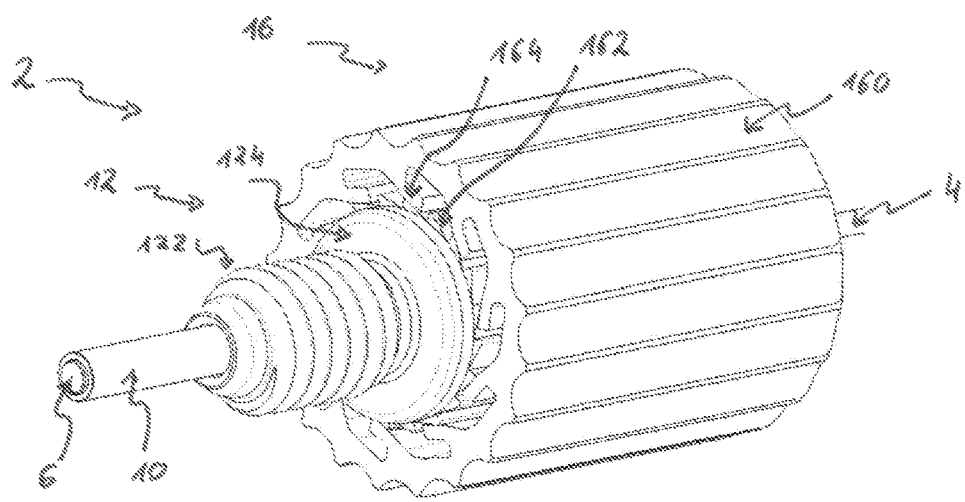
FIG. 12 depicts a plug unit according to a still further embodiment.

FIG. 12 depicts a perspective view of an embodiment of the present technology. More particularly, this FIG. depicts an embodiment comprising a torque limitation assembly 16. The depicted embodiment of the plug unit 2 comprises a capillary 4, a sealing element 6, a thrust piece 10 and an housing assembly 12 comprising a first housing section 122 and a second housing section 124. It will be understood that all these elements may be realized as discussed above in conjunction with any of the discussed embodiments.

Further, the plug unit 12 also comprises a torque limitation assembly 16 configured to limit the torque used to screw in the plug unit 2 to a (not depicted) socket unit. More particularly, the torque limitation assembly 16 comprises a plurality of ridges or gear racks 162 located on the outer diameter of (the second section 124 of) the housing assembly 12. Further, there is provided a torque limitation element 160 surrounding (the second section 124 of) the housing assembly 12 and provided with a plurality of engagement elements 164 on its inner diameter. When screwing in the plug unit 12, the engagement elements 164 engage the ridges 162 up to a pre-determined torque. After reaching this torque, the engagement elements 164 bend and slide over the ridges 162, such that it is not possible to further tighten the thread beyond the pre-determined torque. Thus, the torque may be limited, which may decrease the risk of any components (e.g., the thread, the capillary, and/or the sealing element) being damaged. Further, when unscrewing the plug unit 2 from a socket unit, the engagement elements 164 may always be in contact with the ridges 162, i.e., the overall assembly may be asymmetrical and only limiting the torque in one direction. As depicted, the torque limitation assembly 16 may comprise knurls on its outer surface to simplify the usage of the torque assembly 16. While such a torque limitation assembly 16 may be particularly useful in connection with the above described sealing by means of a biasing element 8, it will be understood that it may also be used independently from such a biasing element.

While the above torque limitation assembly 16 has been described in conjunction with embodiments of a plug unit according to the present technology, it will be understood that the torque limitation assembly 16 may also be employed in conjunction with other plug units. That is, the torque limitation assembly 16 may generally be part of a plug unit 2 comprising a capillary 4 and a sealing element 6, independent of the other features. That is, the other features discussed (e.g., relating to the biasing element, the thrust piece, and the thrust transmission element) may be used in conjunction with the torque limitation assembly, however, such a combined usage is not a necessity.

It will generally be understood that the discussed housing assembly 12 of the plug unit 2 (which may also be referred to as screw 12) may feature a simple integrated torque assembly in order to provide the user with a signal for safe connection (haptic feedback). While in the above, a particular torque limitation assembly has been described, it will be understood that other torque assemblies may also be employed.

In general words and with primary reference to FIGS. 1 to 11, some embodiments of the present technology include an axially movable thrust piece 10 that is fitted to the front (or distal) side of a housing assembly 12, which may comprise threads 1222 (and may therefore also be referred to as a screw). The thrust piece 10 contains a seal 6 on its front side, i.e. on its distal end. While being turned inwards, the screw 12 presses the end of the thrust piece 10 which thus seals via the seal 6 on the port side.

The thrust piece 10 may also function as a seal support to prevent the material from flowing away radially. Thus, the sealing effect may only be provided axially on the front side. This may also be an advantage versus WO2010133192, as here an additional radial sealing effect is provided on the lateral surface which implies a higher screw-in torque and is an additional source of errors, as the seal 6 may jam in lateral surfaces which are not manufactured tidily.

Inside the housing assembly 12 (i.e., inside the screw), an axially slidable capillary 4 is located, to which a thrust transmission element 14 (which may also be referred to as second thrust piece or crimp sleeve) is fastened.

The second inner thrust piece 14 is subjected to an axial force by means of a biasing element 8, e.g., a spring, whereby the capillary 4 is pressed towards the distal direction, i.e., to the front face of the seal 6 of the front thrust piece 10, the front face being directed towards the spring, so that a sealing effect is exercised.

The biasing element 8 (e.g., the spring) is fastened to the housing assembly 12 (i.e., to the "screw") by means of a section 124 of the housing assembly 12, which section 124 may also be referred to as a cap 124. For easier handling, the cap 124 may provided with knurls.

E.g., to seal when the capillary is supplied with a liquid at 1,500 bar, a spring with approx. 20-30 N may be normally used for fused silica capillaries with an outside diameter of Ø 0.36 mm (360 µm).

For larger capillaries, normally made of stainless steel MP35N, titanium with a customary outside diameters of Ø 1/32" (0.79 mm), a spring with 100 N may be used.

Outside diameters of Ø 0.60 mm would also be conceivable; for these, a spring with approx. 50 N would be sufficient.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

What is claimed is:

1. A plug unit configured for use in high performance liquid chromatography, the plug unit comprising:
    A) a capillary comprising a capillary distal face, wherein the capillary distal face is the most distal portion of the capillary;
    B) a sealing element, wherein the sealing element is located distal from the capillary distal face and wherein the capillary distal face abuts a proximal face of the sealing element;
    C) a thrust piece comprising a channel configured to receive the capillary, in which the capillary is configured to move axially with respect to the thrust piece, wherein the sealing element is fixed to the thrust piece and the sealing element is located at a distal end of the thrust piece;
    D) a housing assembly comprises:
        a) a connection mechanism configured to connect to a bushing unit;
        b) a biasing element configured to bias the capillary towards the sealing element;
        c) a thrust piece receiving opening, wherein at least a section of the thrust piece is received in the thrust piece receiving opening, the thrust piece is configured to slide axially with respect to the housing assembly until a proximal face of the thrust piece abuts an abutment face of the housing assembly, in which the housing assembly is configured to transmit an axial force to the thrust piece and then to the sealing element; and
    E) a thrust transmission element fixed to the capillary, in which the thrust transmission element is configured to
        a) slide inside the housing assembly and
        b) transmit an axial force from the biasing element to the capillary.

2. The plug unit of claim 1, in which the housing assembly is configured to receive the thrust piece and prevent the thrust piece from falling out of the housing assembly.

3. The plug unit of claim 1, in which the thrust piece further comprises an undercut and the sealing element comprises a corresponding protruding section, in which the sealing element is fixed to the thrust piece by fitting the corresponding protruding section into the undercut.

4. The plug unit of claim 1, in Which the sealing element comprises:
    a distal section having a distal diameter; and
    a proximal section having a proximal diameter, the proximal diameter being smaller than the distal diameter.

5. The plug unit of claim 1, in which the connection mechanism is a thread.

6. The plug unit of claim 1, in which the connection mechanism is selected from the group consisting of a thread, a bayonet connection mechanism, and a snap-fit connection.

7. The plug unit of claim 1, in which the thrust transmission element is fixed to the capillary with a crimped connection.

8. The plug unit of claim 1, in which the thrust transmission element is fixed to the capillary with a connection selected from the group consisting of a crimped connection, a glued connection, a form fit, a press fit, and a combination thereof.

9. The plug unit of claim 1, wherein the channel of the thrust piece comprises a proximal channel section and a distal channel section, the distal channel section having an inner diameter smaller than an inner diameter of the proximal channel section, and
wherein the capillary comprises a tube and a protective coating surrounding the tube, the tube having a tube outer diameter and the protective coating having a coating outer diameter,
wherein the capillary comprises a distal end section not comprising the protective coating, and
wherein the inner diameter of the distal channel section is smaller than the coating outer diameter.

10. The plug unit of claim 1, wherein the channel of the thrust piece comprises a proximal channel section and a distal channel section, the distal channel section having an inner diameter smaller than an inner diameter of the proximal channel section,
wherein the capillary is formed of one material and the capillary comprises:
a distal section having a distal outer diameter and
a proximal section having a proximal outer diameter, the distal outer diameter being smaller than the proximal outer diameter, and
wherein the inner diameter of the distal channel section is smaller than the proximal outer diameter of the capillary.

11. The plug unit of claim 5 further comprising: a torque limitation assembly configured to limit a torque supplied to the thread.

12. The plug unit of claim 5, in which the housing assembly further comprises a plurality of ridges located on an outer diameter of the housing assembly, the plug unit further comprising a torque limitation element, the torque limitation element surrounding the housing assembly, the torque limitation element comprising a plurality of torque engagement elements located on an inner diameter of the torque limitation element, wherein the torque engagement elements are configured to engage the plurality of ridges up to a predetermined torque and to bend and slide over the ridges if a torque greater than the predetermined torque is applied to the torque limitation element.

13. The plug unit of claim 1, wherein the capillary distal face does not supply a force greater than 10 N to the sealing element when the plug unit is not connected to the bushing unit.

14. The plug unit of claim 1, wherein the capillary distal face does not supply a force greater than 5 N to the sealing element when the plug unit is not connected to the bushing unit.

15. A connection system for use in high performance liquid chromatography, the system comprising:
A) a plug unit comprising:
a) a capillary comprising a capillary distal face, wherein the capillary distal face is the most distal portion of the capillary;
b) a sealing element, wherein the sealing element is located distal from the capillary distal face and wherein the capillary distal face abuts a proximal face of the sealing element;
c) a thrust piece comprising a channel configured to receive the capillary, in which the capillary is configured to move axially with respect to the thrust piece, wherein the sealing element is fixed to the thrust piece and the sealing element is located at a distal end of the thrust piece;
d) a housing assembly comprises:
i) a connection mechanism configured to connect to a bushing unit;
ii) a biasing element configured to bias the capillary towards the sealing element;
iii) a thrust piece receiving opening, wherein at least a section of the thrust piece is received in the thrust piece receiving opening, the thrust piece is configured to slide axially with respect to the housing assembly until a proximal face of the thrust piece abuts an abutment face of the housing assembly, in which the housing assembly is configured to transmit an axial force to the thrust piece and then to the sealing element; and
e) a thrust transmission element fixed to the capillary, in which the thrust transmission element is configured to
i) slide inside the housing assembly and
ii) transmit an axial force from the biasing element to the capillary; and
B) a bushing unit configured to receive the plug unit.

16. A method of connecting a plug unit to a bushing unit, in which the plug unit and the bushing unit are configured for use in high performance liquid chromatography,
A) the plug unit comprising:
a) a capillary comprising a capillary distal face, wherein the capillary distal face is the most distal portion of the capillary;
b) a sealing element, wherein the sealing element is located distal from the capillary distal face and wherein the capillary distal face abuts a proximal face of the sealing element;
c) a thrust piece comprising a channel configured to receive the capillary, in which the capillary is configured to move axially with respect to the thrust piece, wherein the sealing element is fixed to the thrust piece and the sealing element is located at a distal end of the thrust piece;
d) a housing assembly comprises:
i) a connection mechanism configured to connect to the bushing unit;
ii) a biasing element configured to bias the capillary towards the sealing element;
iii) a thrust piece receiving opening, wherein at least a section of the thrust piece is received in the thrust piece receiving opening, the thrust piece is configured to slide axially with respect to the housing assembly until a proximal face of the thrust piece abuts an abutment face of the housing assembly, in which the housing assembly is configured to transmit an axial force to the thrust piece and then to the sealing element; and e) a thrust transmission element fixed to the capillary, in which the thrust transmission element is configured to
   i) slide inside the housing assembly and
   ii) transmit an axial force from the biasing element to the capillary; and
B) the bushing unit configured to receive the plug unit, the method comprising:
   inserting the plug unit into the bushing unit;
      contacting the sealing element to a bottom section of the bushing unit;
      abutting the capillary distal face to the sealing element; and
   advancing the housing assembly into the bushing unit to cause a compression of the biasing element and to cause the axial force from the biasing element to the capillary in the distal direction.

17. The method of claim 16 further comprising:
abutting the proximal face of the thrust piece against the proximal abutment face of the housing assembly to transmit the axial force from the housing assembly to the thrust piece and then to the sealing element.

\* \* \* \* \*

UNITED STATES PATENT AND TRADEMARK OFFICE
CERTIFICATE OF CORRECTION

PATENT NO. : 11,554,330 B2
APPLICATION NO. : 16/216592
DATED : January 17, 2023
INVENTOR(S) : Daniel Buerger It is certified that error appears in the above-identified patent and that said Letters Patent is hereby corrected as shown below:

In the Claims

In Column 22, Claim 4, Line 61, delete "Which" and insert -- which --, therefor.

In Column 23, Claim 11, Line 39, delete "5 further" and insert -- 5, further --, therefor.

In Column 25, Claim 17, Line 18, delete "16 further" and insert -- 16, further --, therefor.

Signed and Sealed this
Twenty-eighth Day of February, 2023

Katherine Kelly Vidal
*Director of the United States Patent and Trademark Office*